US008360098B2

United States Patent
Chuang et al.

(10) Patent No.: US 8,360,098 B2
(45) Date of Patent: Jan. 29, 2013

(54) MONODIRECTIONAL INTAKE PRESSURE STABILIZATION STRUCTURE OF PNEUMATIC TOOL

(76) Inventors: Chia-Chiung Chuang, Taicung (TW); Fu-Yang Chuang, Taicung (TW)

( * ) Notice: Subject to any disclaimer, the term of this patent is extended or adjusted under 35 U.S.C. 154(b) by 388 days.

(21) Appl. No.: 12/754,979

(22) Filed: Apr. 6, 2010

(65) Prior Publication Data
US 2010/0263737 A1 Oct. 21, 2010

(30) Foreign Application Priority Data
Apr. 16, 2009 (TW) .............................. 98206338 U

(51) Int. Cl.
*B23B 45/04* (2006.01)

(52) U.S. Cl. ......... 137/505.14; 137/505.25; 137/505.41; 137/505.43; 137/505.44; 173/93.5; 173/109; 173/169

(58) Field of Classification Search ............. 137/505.14, 137/505.25, 505.38, 505.39, 505.41, 505.43, 137/505.44; 173/109, 168, 169, 93.5
See application file for complete search history.

(56) References Cited

U.S. PATENT DOCUMENTS

| 3,354,732 | A | * | 11/1967 | Wickham | 74/99 R |
|---|---|---|---|---|---|
| 3,454,041 | A | * | 7/1969 | Masson | 137/505.25 |
| 3,833,068 | A | * | 9/1974 | Hall | 173/169 |
| 3,951,217 | A | * | 4/1976 | Wallace et al. | 173/169 |
| 4,834,131 | A | | 5/1989 | Austin | |
| 5,293,747 | A | * | 3/1994 | Geiger | 60/493 |
| 5,379,761 | A | * | 1/1995 | Schuler | 128/205.24 |
| 6,044,917 | A | * | 4/2000 | Brunhoelzl | 173/93.5 |
| 6,634,378 | B2 | * | 10/2003 | Semeia | 137/505.25 |
| 6,823,949 | B2 | * | 11/2004 | Giardino | 173/93 |
| 6,880,645 | B2 | * | 4/2005 | Izumisawa | 173/93.5 |
| 6,883,619 | B1 | * | 4/2005 | Huang | 173/93.5 |
| 7,007,714 | B2 | * | 3/2006 | Carroll | 137/505.25 |
| 2002/0088495 | A1 | * | 7/2002 | Semeia | 137/505.25 |
| 2008/0047721 | A1 | * | 2/2008 | Chen et al. | 173/15 |

FOREIGN PATENT DOCUMENTS

| TW | 088213989 | 8/1999 |
|---|---|---|
| TW | 095131045 | 8/2006 |

* cited by examiner

*Primary Examiner* — William McCalister
(74) *Attorney, Agent, or Firm* — Guice Patents PLLC

(57) ABSTRACT

A monodirectional intake pressure stabilization structure of pneumatic tool includes a tool main body and a pressure stabilization unit. The pressure stabilization unit is disposed in a first directional intake passage formed in the tool main body for controlling the pressure of the air guided by the first directional intake passage into an air chamber of the tool main body. Accordingly, excessively great intake pressure can be avoided so as to avoid over-torque output of the pneumatic tool. In this case, the pneumatic tool can stably output power within a safety range in accordance with the requirements of actual use. The pressure stabilization unit can be a pressure stabilizer or a pressure relief valve.

2 Claims, 9 Drawing Sheets

MONODIRECTIONAL INTAKE PRESSURE STABILIZATION STRUCTURE OF PNEUMATIC TOOL

BACKGROUND OF THE INVENTION

1. Field of the Invention

The present invention relates generally to a pneumatic tool, and more particularly to a monodirectional intake pressure stabilization structure of pneumatic tool.

2. Description of the Related Art

A pneumatic tool is powered by a compressed air source. Through internal forward or backward air passage of the pneumatic tool, external high-pressure air is guided into internal air chamber of the pneumatic tool for driving a rotor. The rotor further drives an output shaft to forward rotate or backward rotate to output power for operation. In general, the flow of compressed air entering the pneumatic tool can be changed to adjust the forward rotational speed and output torque. On the other hand, with respect to the backward rotation, the compressed air often enters the air chamber at a maximum flow for outputting maximum torque in accordance with the torque requirement of actual operation, for example, screwing and unscrewing of a forward worm.

However, the pressure value of the compressed air provided for the pneumatic tool is unstable. In general, the pressure value of the compressed air provided by an air compressor ranges from about 70 psi to 270 psi. Therefore, in the case that the compressed air is supplied to the pneumatic tool in an uncontrolled or unstable state, the output torque is hard to be stable. As a result, even after the flow of compressed air for forward rotation is regulated, the pneumatic tool may still output excessively great and unstable torque. This may lead to damage of the work piece.

U.S. Pat. No. 4,834,131 discloses a pneumatic tool in which a safety valve is arranged between the pneumatic tool and the compressed air source. In the case that the pressure value of the compressed air exceeds a set value, the compressed air will be released to the atmosphere before entering the pneumatic tool so as to obviate the defect existing in the prior art. Such technique is able to avoid over torque in forward rotation. However, such measure will also reduce the maximum torque value in backward rotation. Accordingly, it is impossible to take both situations into consideration. Taiwanese Patent No. 095131045 discloses an improved technique in which the safety valve is inbuilt in the cylinder of the pneumatic tool as a part thereof. Such safety valve is able to release the over high-pressure air to the exterior of the pneumatic tool. Such technique helps in stabilizing the pressure. However, such technique is still unsatisfactory.

SUMMARY OF THE INVENTION

It is therefore a primary object of the present invention to provide a monodirectional intake pressure stabilization structure of pneumatic tool, which is able to adjust and stabilize the pressure of the air taken into the air chamber of the pneumatic tool in one direction.

To achieve the above and other objects, the monodirectional intake pressure stabilization structure of the pneumatic tool of the present invention includes a tool main body and a pressure stabilization unit. The pressure stabilization unit is disposed in a first directional intake passage formed in the tool main body for controlling the pressure of the air guided by the first directional intake passage into an air chamber of the tool main body. Accordingly, excessively great intake pressure can be avoided so as to avoid over-torque output of the pneumatic tool. In this case, the pneumatic tool can stably output power within a safety range in accordance with the requirements of actual use. The pressure stabilization unit can be a pressure stabilizer.

The present invention can be best understood through the following description and accompanying drawings, wherein:

DETAILED DESCRIPTION OF THE PREFERRED EMBODIMENTS

Figure 1:
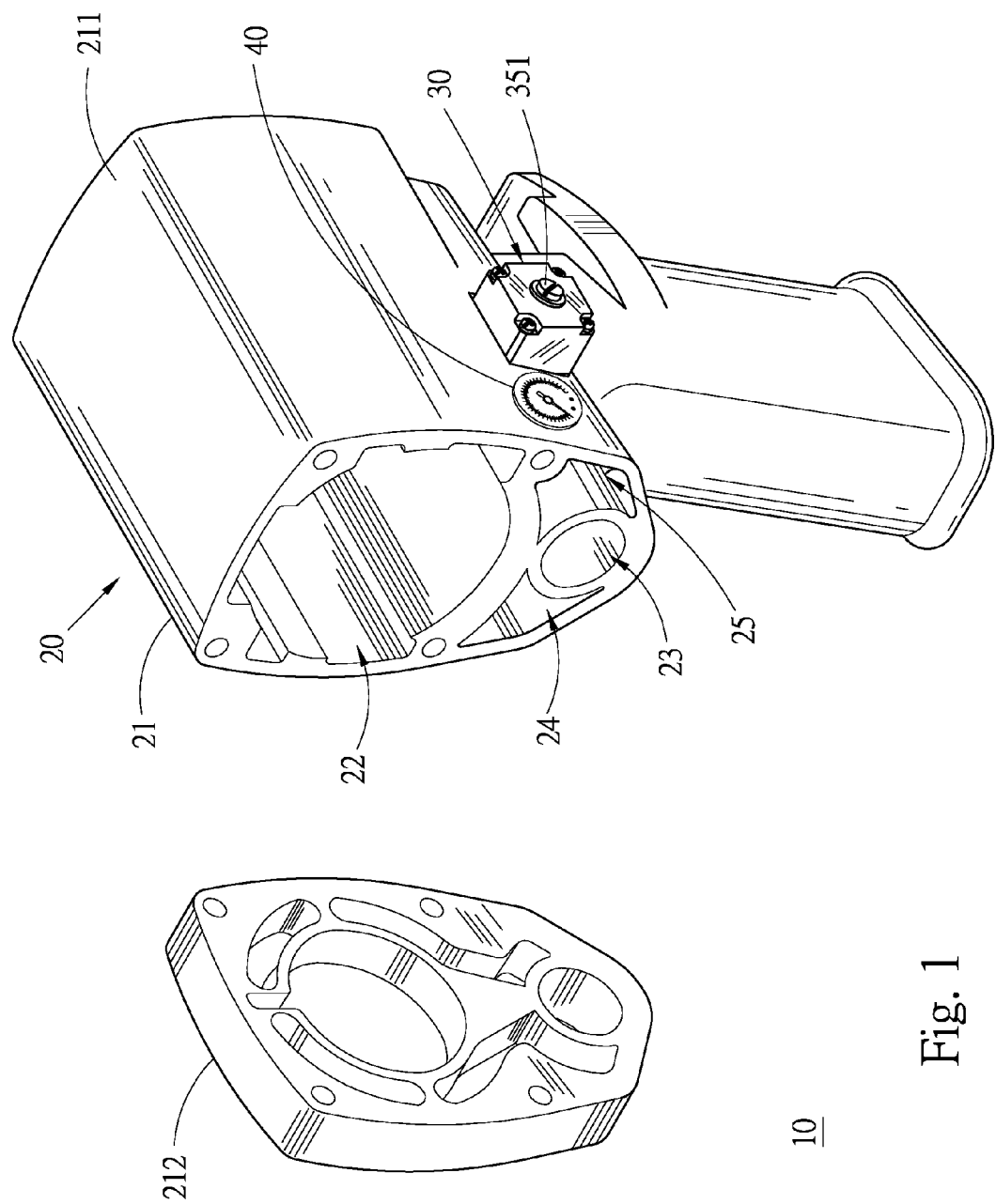
FIG. 1 is a perspective view of a first embodiment of the present invention.
Figure 2:
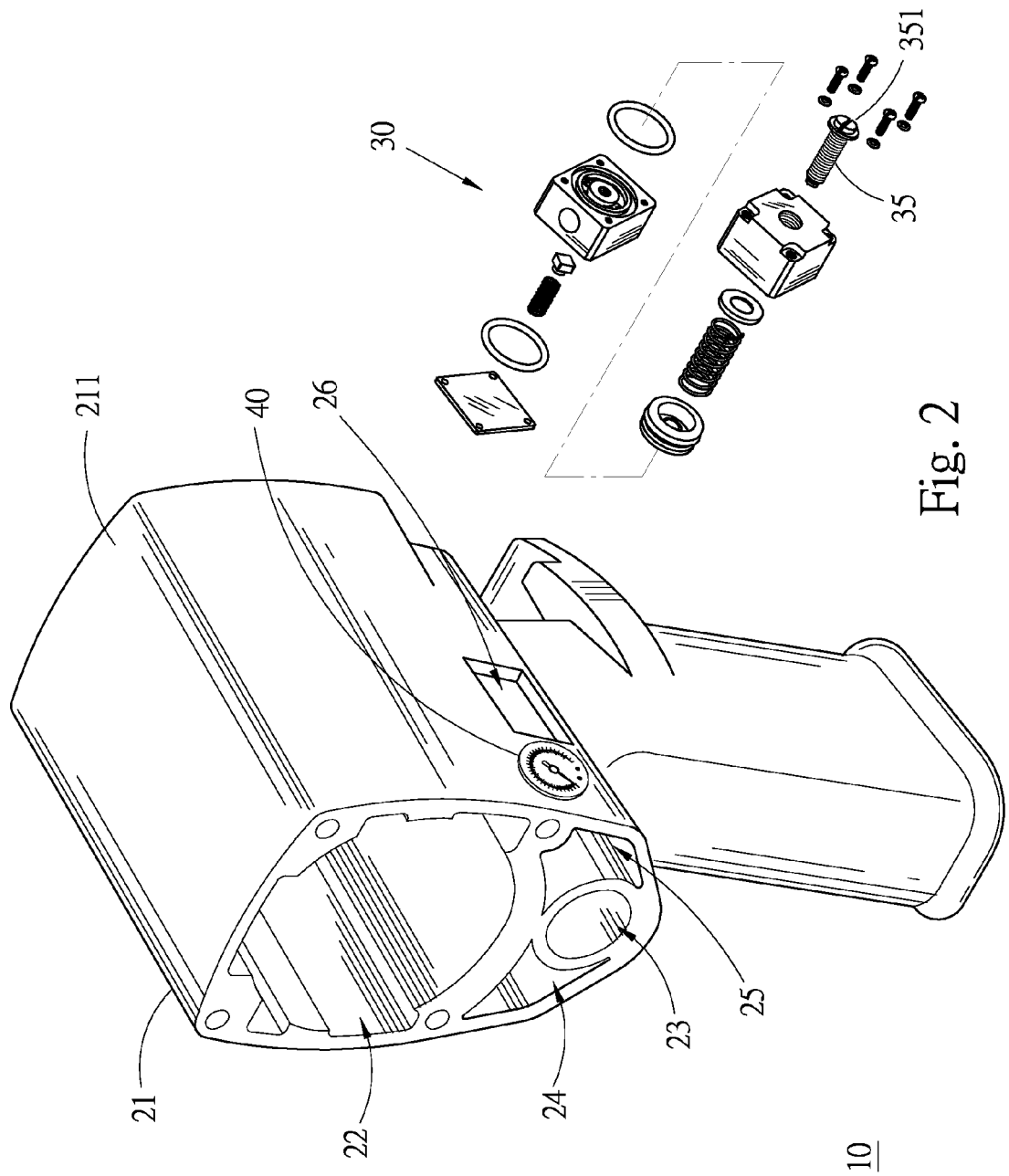
FIG. 2 is a perspective exploded view of the first embodiment of the present invention.
Figure 3:
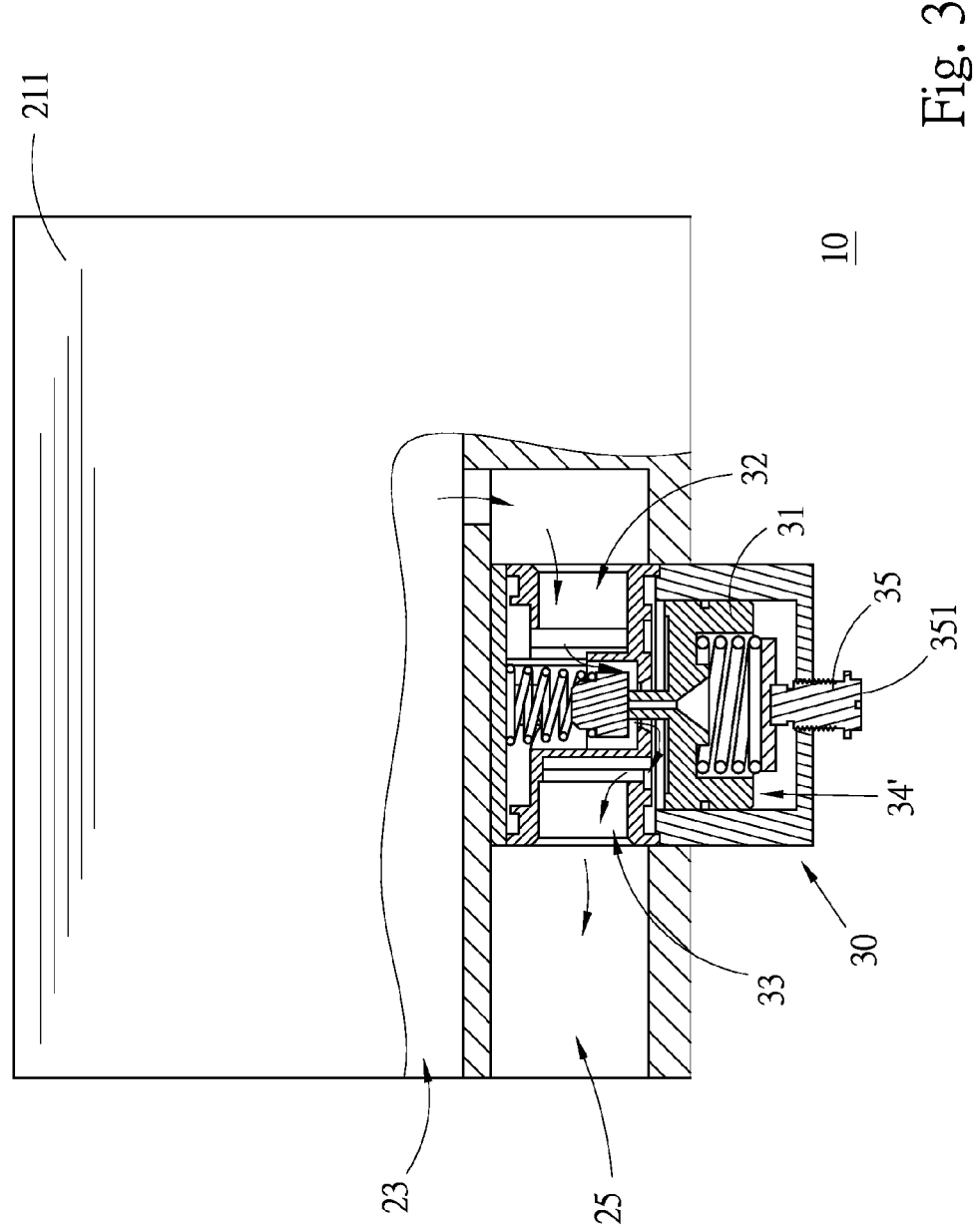
FIG. 3 is a sectional view of the first embodiment of the present invention.
Figure 4:
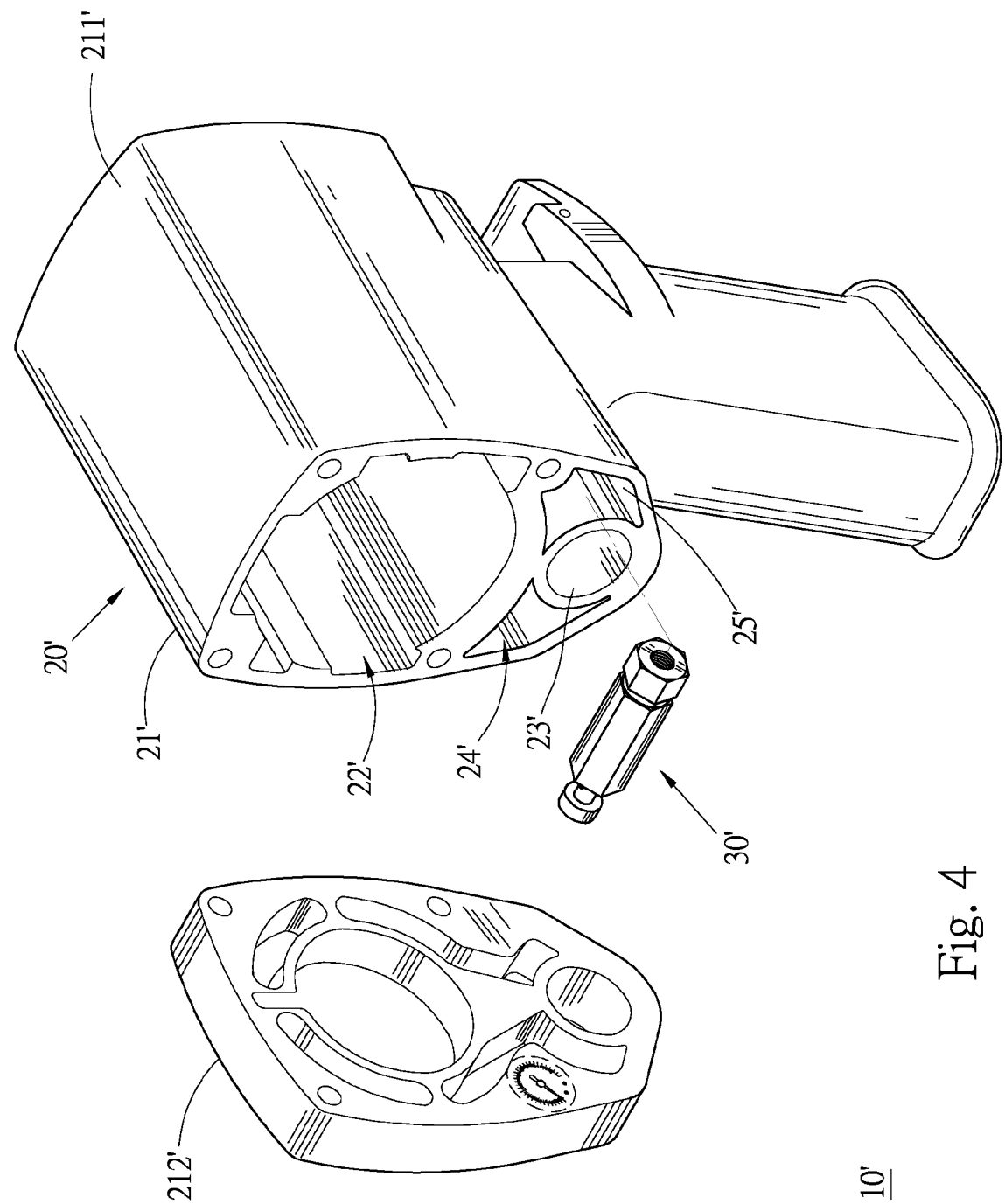
FIG. 4 is a perspective view of a second embodiment of the present invention.
Figure 5:
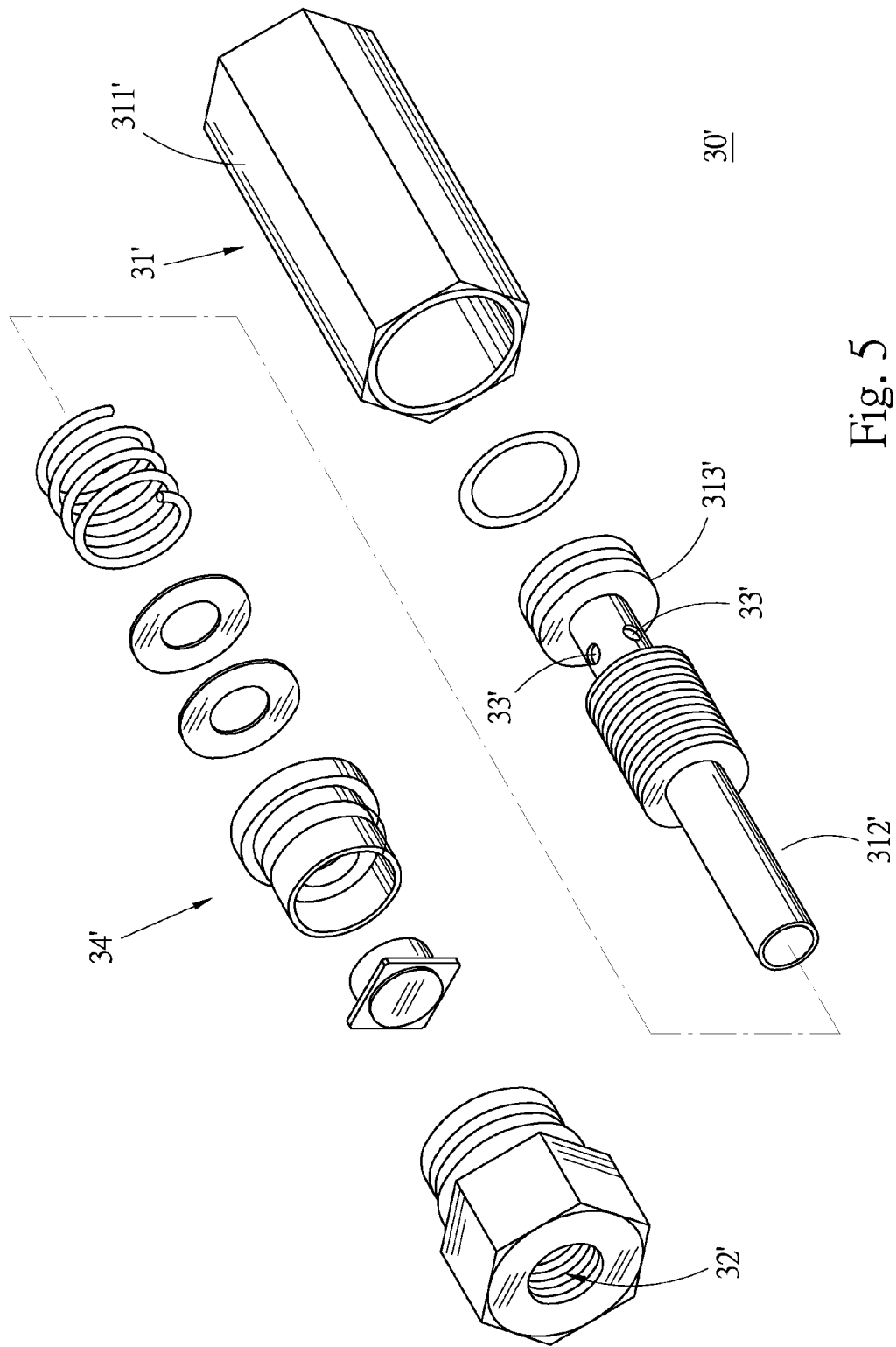
FIG. 5 is a perspective exploded view of the pressure stabilization unit of the second embodiment of the present invention.
Figure 6:
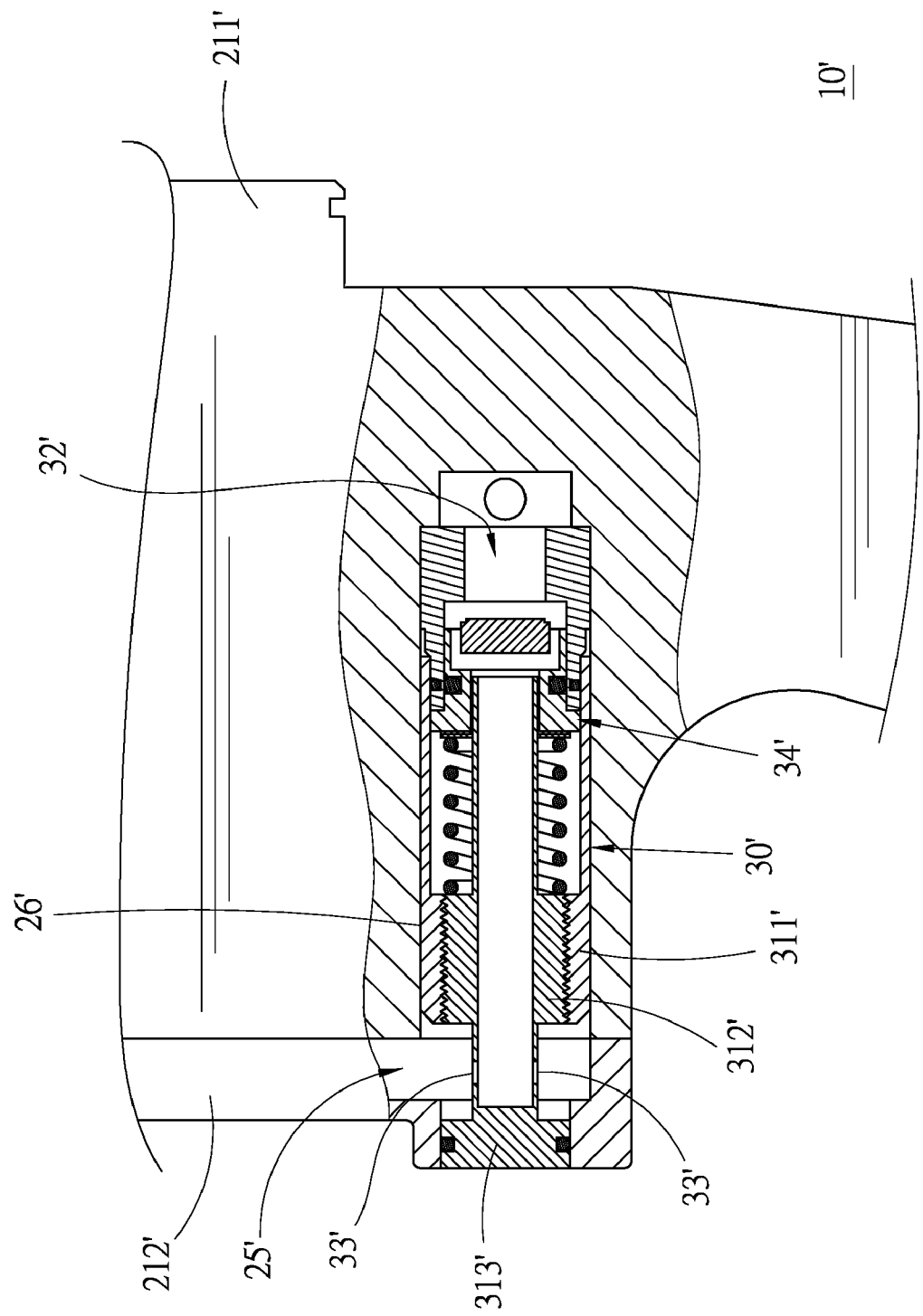
FIG. 6 is a sectional view of the second embodiment of the present invention, in which no air is taken into the air chamber of the pneumatic tool.
Figure 7:
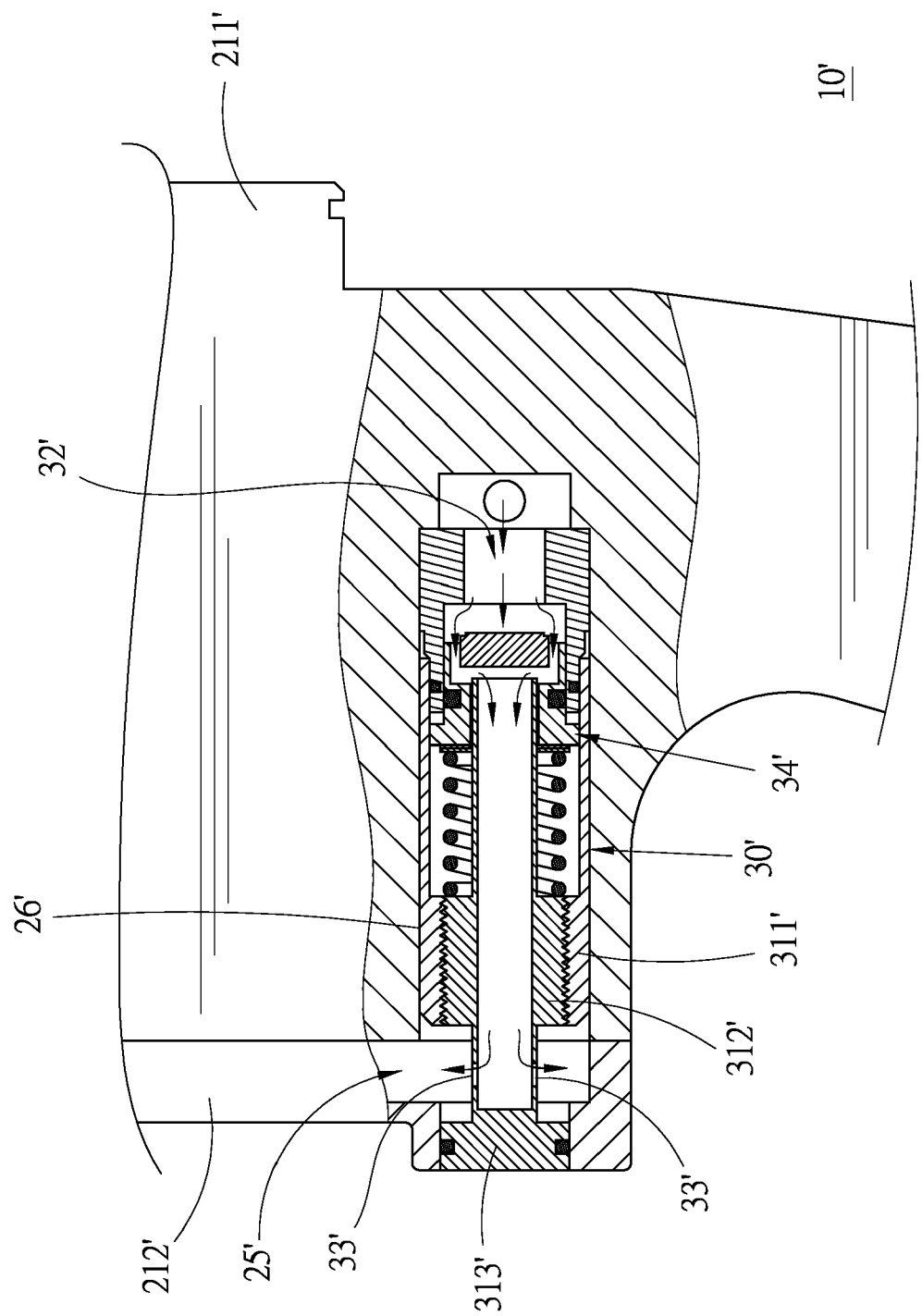
FIG. 7 is a sectional view of the second embodiment of the present invention, showing that external high-pressure air flows through the first directional intake passage into the air chamber of the pneumatic tool.

Please refer to FIGS. 1 to 3. According to a first preferred embodiment, the monodirectional intake pressure stabilization structure 10 of pneumatic tool of the present invention mainly includes a tool main body 20 and a pressure stabilization unit 30.

The tool main body 20 has a body section 21 composed of a housing 211 and a rear cap 212 connected thereto. An internal air chamber 22 is formed in the body section 21 for accommodating therein a conventional pneumatic cylinder and rotor of the pneumatic tool. A control valve hole 23 is formed on the body section 21 for accommodating therein a conventional control valve of the pneumatic tool. The body section 21 is further formed with a second directional intake passage 24 connected with a lateral wall of the control valve hole 23 and the air chamber 22. The second directional intake passage 24 serves to guide the external high-pressure air to go from one side of the air chamber 22 into the air chamber 22 so as to provide backward airflow. The body section 21 is further formed with a first directional intake passage 25 connected with another lateral wall of the control valve hole 23 and the air chamber 22. The first directional intake passage 25 serves to guide the external high-pressure air to go from another side of the air chamber 22 into the air chamber 22 so as to provide forward airflow. A receiving space 26 is formed on a lateral wall of the body section 21 in communication with the first directional intake passage 25.

The pressure stabilization unit 30 is a pressure stabilizer fixedly inlaid in the receiving space 26 for blocking the first directional intake passage 25. The pressure stabilization unit 30 has a main body 31. An intake port 32 and an exhaust port 33 are respectively disposed on two sides of the main body 31 in coaxial communication with the blocked first directional intake passage 25. A pressure stabilization section 34 is disposed in the main body 31 for controlling the pressure of the air flowing from the intake port 32 to the exhaust port 33. Such technique pertains to prior art and has been disclosed in Taiwanese Patent No. 088213989 and thus will not be further described hereinafter.

According to the above arrangement, when the external high-pressure air is controlled by the control valve to enter the first directional intake passage 25 for forward rotation of the pneumatic tool, the high-pressure air entering the first directional intake passage 25 is controlled by the pressure stabilization unit 30. Accordingly, the high-pressure air can enter the air chamber 22 only in the case that the pressure value is not over a set value. Therefore, excessively great forward intake pressure can be avoided so as to avoid over-torque output of the pneumatic tool. In this case, the pneumatic tool can stably output power within a safety range.

It should be noted that:

1. The forward intake pressure value needs to be varied with the change of the operation condition. Therefore, the set pressure value of the pressure stabilization unit 30 is adjustable via an end 351 of an adjustment threaded rod 35 protruding from the body section 21. Accordingly, the range of the forward intake pressure can be controlled in accordance with the requirements of actual operation.
2. The monodirectional intake pressure stabilization structure 10 of the pneumatic tool of the present invention can further include a pressure display section 40. After the pressure stabilization unit 30 stabilizes the pressure, the pressure display section 40 serves to display the actual intake pressure value to provide proper operation information for an operator.

The present invention has, but not limited to, the above technical characteristics of the first embodiment. In practice, the pressure stabilization unit 30 is not limited to the aforesaid pressure stabilizer. That is, according to a second embodiment, the pressure stabilization unit 30 of the present invention alternatively can be a pressure stabilizer as shown in FIGS. 4 to 7.

To speak more specifically, the second embodiment of the monodirectional intake pressure stabilization structure 10' of the pneumatic tool of the present invention is substantially identical to the first embodiment. The second embodiment is only different from the first embodiment in that the pressure stabilization unit 30' is a different type of pressure stabilizer. The type of the adopted pressure stabilizer is irrelevant to the main technical characteristics of the present invention. That is, any pressure stabilization technique that can provide pressure stabilization effect is applicable to the body section 21' of the pneumatic tool for adjusting the forward intake pressure of the compressed air that goes through the first directional intake passage 25' into the internal air chamber 22 of the pneumatic tool. All these equivalent techniques are included in the scope of the present invention.

The pressure stabilization unit 30' of the second embodiment has a tubular main body 31. An intake port 32' and at least one exhaust port 33' are respectively disposed on two sides of the main body 31' and coaxial with the first directional intake passage 25. A pressure stabilization section 34' is disposed in the main body 31' between the intake port 32' and the exhaust port 33' for restricting and stabilizing the pressure of the air flowing from the intake port 32' to the exhaust port 33.

To speak more specifically, the main body 31' includes an outer tube 311, an inner tube 312' and an end piece 313'. A middle section of the inner tube 312' is coaxially screwed in a first end of the outer tube 311. A second end of the inner tube 312' is positioned in the outer tube 311' and spaced from a second end thereof. The pressure stabilization section 34' is received in the outer tube 311' and positioned between the second end of the inner tube 312' and the second end of the outer tube 311. The end piece 313' is fixedly connected with a first end of the inner tube 312' and rotatably connected with the rear cap 212' of the body section 21'. The intake port 32' is the opening of the second end of the outer tube 311'. Preferably, there are multiple exhaust ports 33' formed through the tubular wall of the first end of the inner tube 312' in communication with the interior of the inner tube 312' and the first directional intake passage 25.

In this embodiment, when adjusting the set pressure value of the pressure stabilization unit 30, an operator only needs to rotate the inner tube 312' via the end piece 313' to change the compression extent of a spring of the pressure stabilization section 34. Accordingly, the pressure stabilization unit 30' can control and stabilize the intake pressure value.

Figure 8:
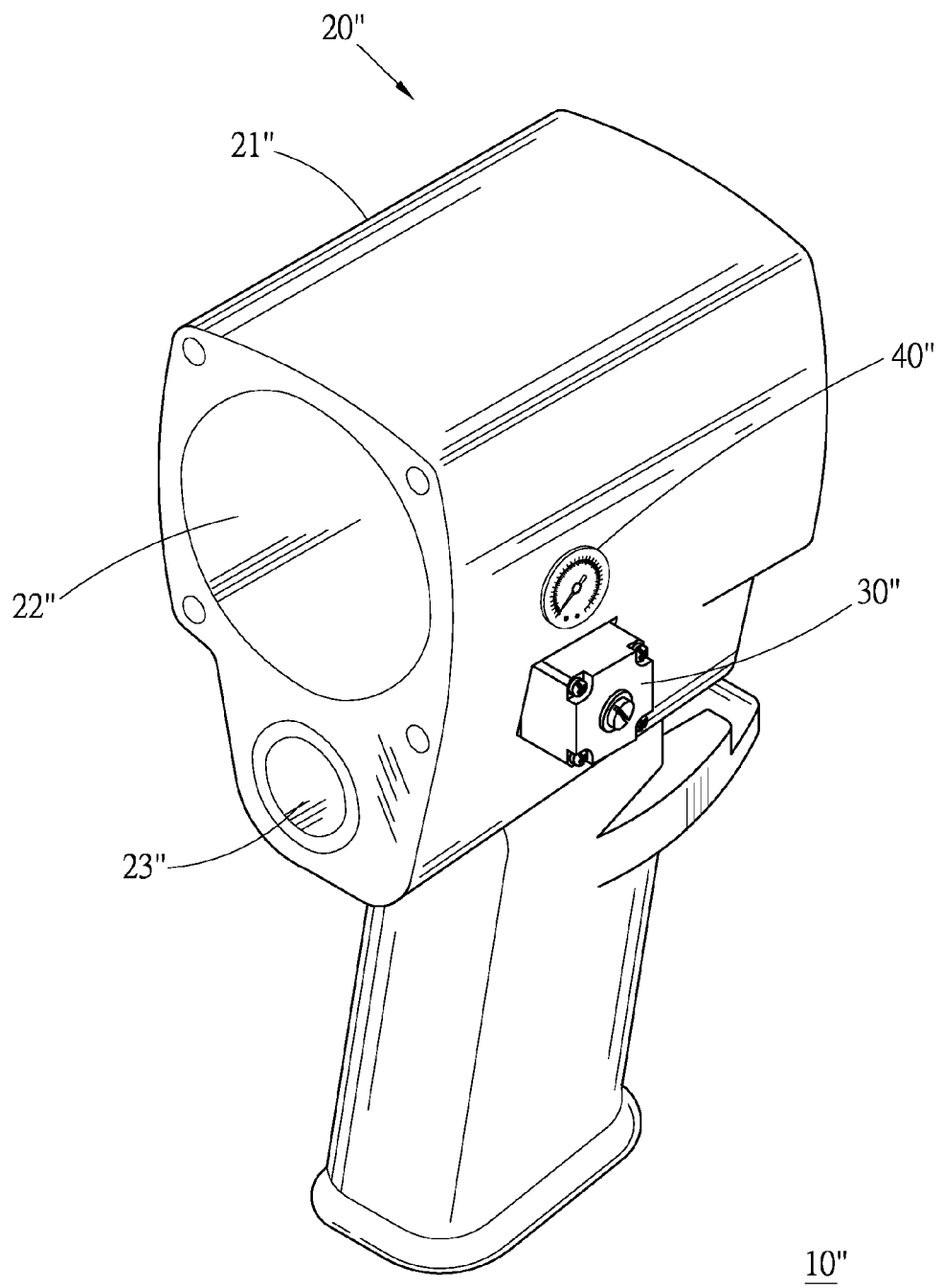
FIG. 8 is a perspective view of a third embodiment of the present invention.
Figure 9:
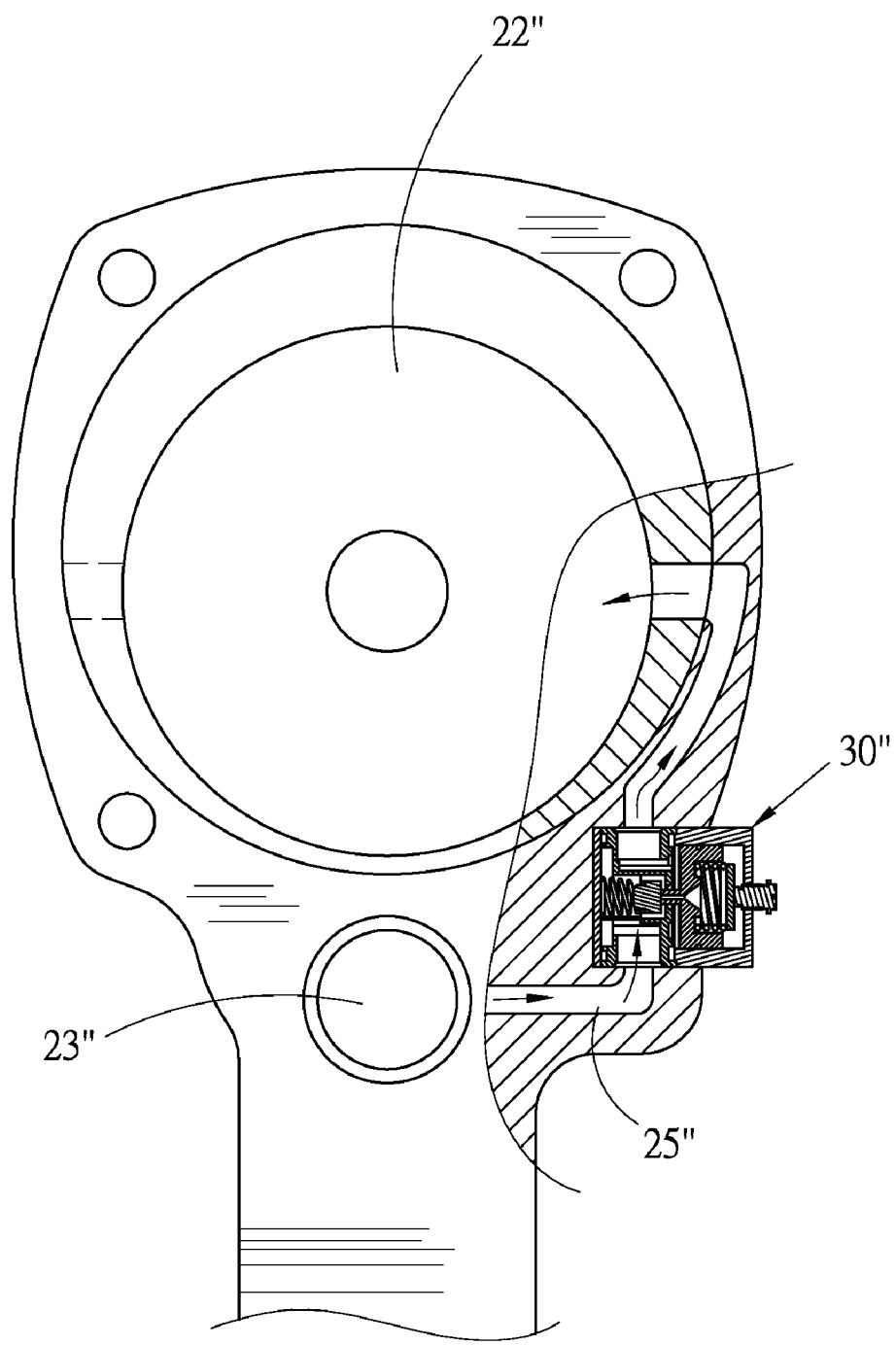
FIG. 9 is a sectional view of the third embodiment of the present invention.

In addition, it should be noted that in both the tool main bodies 20, 20' of the above two embodiments, the air is taken in from the rear cap in a conventional manner. However, the intake of the pneumatic tool can be alternatively achieved in a manner other than the above manner. For example, FIGS. 8 and 9 show a third embodiment of the present invention, in which the air is taken into the air chamber 22" in an internal intake manner.

The third embodiment of the monodirectional intake pressure stabilization structure 10" of the pneumatic tool of the present invention is substantially identical to the first embodiment. The third embodiment is only different from the first embodiment in that the first directional air intake passage and the second directional air intake passage of the third embodiment extend in a path different from that of the first embodiment. In the third embodiment, the first directional air intake passage and the second directional air intake passage are not defined by the housing and the rear cap. Instead, the first directional air intake passage and the second directional air intake passage directly extend from the control valve hole 23" through the interior of the body section 21" to communicate with the air chamber 22". In practice, no matter how the air is taken in, the present invention can always achieve the object of monodirectional intake pressure stabilization. That is, the present invention is applicable to various pneumatic tools without limitation to the foregoing.

The above embodiments are only used to illustrate the present invention, not intended to limit the scope thereof. Many modifications of the above embodiments can be made without departing from the spirit of the present invention.

What is claimed is:

1. A monodirectional intake pressure stabilization structure of pneumatic tool, comprising:
    a tool main body having a body section, an internal air chamber being formed in the body section, the body section being further formed with a first directional intake passage in communication with one side of the air chamber for guiding external high-pressure air to flow into the air chamber, the body section being further formed with a second directional intake passage independent from the first directional intake passage, the second directional intake passage communicating with another side of the air chamber for guiding the external high-pressure air to flow into the air chamber, a receiving space being formed on the body section in communication with the first directional intake passage; and a pressure stabilization unit inlaid in the receiving space for restricting the pressure of the high-pressure air guided by the first directional intake passage into the air chamber;

wherein the pressure stabilization unit is a pressure stabilizer;

wherein the pressure stabilization unit includes a main body received in the receiving space for blocking the first directional intake passage, an intake port and an exhaust port being respectively disposed on two sides of the main body in communication with the first directional intake passage, a pressure stabilization section being disposed in the main body for restricting the pressure of the high-pressure air flowing from the intake port to the exhaust port;

wherein the main body includes an outer tube, an inner tube and an end piece, a middle section of the inner tube being coaxially screwed in the outer tube, a second end of the inner tube being spaced from one end of the outer tube, the pressure stabilization section being received in the outer tube and positioned between the second end of the inner tube and the end of the outer tube, the end piece being fixedly connected with a first end of the inner tube and rotatably connected with the body section.

2. The monodirectional intake pressure stabilization structure of the pneumatic tool as claimed in claim 1, wherein the intake port is an opening of the end of the outer tube, the exhaust port being formed through a tubular wall of the first end of the inner tube in communication with an interior of the inner tube and the first directional intake passage.

\* \* \* \* \*